(12) United States Patent
Tomaru et al.

(10) Patent No.: US 8,885,697 B2
(45) Date of Patent: Nov. 11, 2014

(54) RECEPTION DEVICE (75) Inventors: Kenya Tomaru, Tokyo (JP); Manabu Nakamura, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 13/978,757

(22) PCT Filed: Jan. 12, 2012

(86) PCT No.: PCT/JP2012/050458
§ 371 (c)(1),
(2), (4) Date: Jul. 9, 2013

(87) PCT Pub. No.: WO2012/102089
PCT Pub. Date: Aug. 2, 2012

(65) Prior Publication Data
US 2013/0287086 A1  Oct. 31, 2013

(30) Foreign Application Priority Data
Jan. 27, 2011  (JP) .................................. 2011-015570

(51) Int. Cl.
*H03H 7/30*  (2006.01)
*H04B 7/08*  (2006.01)
*H04L 25/03*  (2006.01)

(52) U.S. Cl.
CPC ..... *H04L 25/03891* (2013.01); *H04L 25/03038* (2013.01); *H04B 7/0814* (2013.01); *H04L 2025/03656* (2013.01)
USPC ........... 375/232; 375/229; 375/230; 375/295; 375/316; 375/350

(58) Field of Classification Search
USPC ......... 375/219, 229, 230–232, 233, 259, 271, 375/286, 295, 316, 322, 350
See application file for complete search history.

(56) References Cited

U.S. PATENT DOCUMENTS

| 5,455,844 A * | 10/1995 | Ishikawa et al. ............... 375/232 |
| 5,940,454 A * | 8/1999 | McNicol et al. ............... 375/347 |
| 7,039,123 B2 * | 5/2006 | Kokuryo et al. ............... 375/295 |
| 7,466,750 B2 * | 12/2008 | Kim et al. ...................... 375/233 |
| 8,588,340 B2 * | 11/2013 | Tomita et al. .................. 375/316 |
| 2002/0036718 A1 * | 3/2002 | Lee ................................ 348/731 |
| 2002/0167999 A1 | 11/2002 | Naito et al. |
| 2003/0152159 A1 * | 8/2003 | Denno ........................... 375/267 |
| 2004/0091070 A1 * | 5/2004 | Kim et al. ...................... 375/350 |

(Continued)

FOREIGN PATENT DOCUMENTS

| JP | 03-274828 | 12/1991 | | |
| JP | 03274828 A | * 12/1991 | ............... H04B 7/02 |

(Continued)

*Primary Examiner* — Hirdepal Singh
(74) *Attorney, Agent, or Firm* — Bacon & Thomas, PLLC (57) ABSTRACT

A reception device includes two antennas 1-1, 1-2 that are in an inverse correlation, a switching unit 4 which switches the signal that is to be processed among signals received by the two antennas 1-1, 1-2, and an adaptive equalizer 6 which uses equalization coefficients to perform equalizing processing on the signal considered by the switching unit 4 to be the signal to be processed, and an equalization coefficient altering unit 7 which alters the equalization coefficients used by the adaptive equalizer 6 synchronously with the timing of switching performed by the switching unit 4. In the reception device can reduce the required time for reconvergence of equalization coefficients stemming from reception system switching in selection diversity using an inverse correlation antenna.

4 Claims, 7 Drawing Sheets

(56) References Cited

U.S. PATENT DOCUMENTS

2006/0234662 A1* 10/2006 Diloisy .................... 455/273
2008/0291336 A1* 11/2008 Kim et al. ................ 348/729
2012/0314755 A1* 12/2012 Pietraski et al. ......... 375/232

FOREIGN PATENT DOCUMENTS

| | | |
|---|---|---|
| JP | 2002-135182 | 5/2002 |
| JP | 2002-344362 | 11/2002 |
| JP | 2007-158424 | 6/2007 |

* cited by examiner

RECEPTION DEVICE

FIELD OF THE INVENTION

The present invention relates to a reception device; and, more particularly, to a reception device capable of reducing required time for reconvergence of equalization coefficients stemming from reception system switching in selection diversity using an inverse correlation antenna.

BACKGROUND OF THE INVENTION

For example, in a fixed communication system of a microwave band, communication may be carried out between two points on the surface of the sea level. At this time, a radio wave, transmitted by a transmission antenna and directly received by a reception antenna, is referred to as a direct wave; and a radio wave, transmitted by the transmission antenna and received by the reception antenna after being reflected on the sea level, is referred to as a reflected wave. The reception antenna receives a combination of the direct wave and the reflected wave.

The sea surface reflected wave is delayed due to the difference in the transmission path with respect to the direct wave. Thus the reflected wave becomes a signal having different amplitude/phase from those of the direct wave. Since the sea level is changed by a tide level or a wave, the path of the sea surface reflected wave is affected and changed. Accordingly, the reception antenna receives a combined wave of the direct wave and the sea level reflected wave whose amplitude and phase change with time. As a result, fading occurs by the changes in the sea surface.

A diversity scheme is suggested to overcome the fading problem.

In a fixed communication system of a microwave band, paths can be comparatively easily estimated. From such characteristics, it is possible to realize an antenna selection diversity in which antennas are installed in an inverse correlation.

The antenna selection diversity in which antennas are installed in an inverse correlation will be explained with reference to (a) to (c) of FIG. 5.

Figure 5:
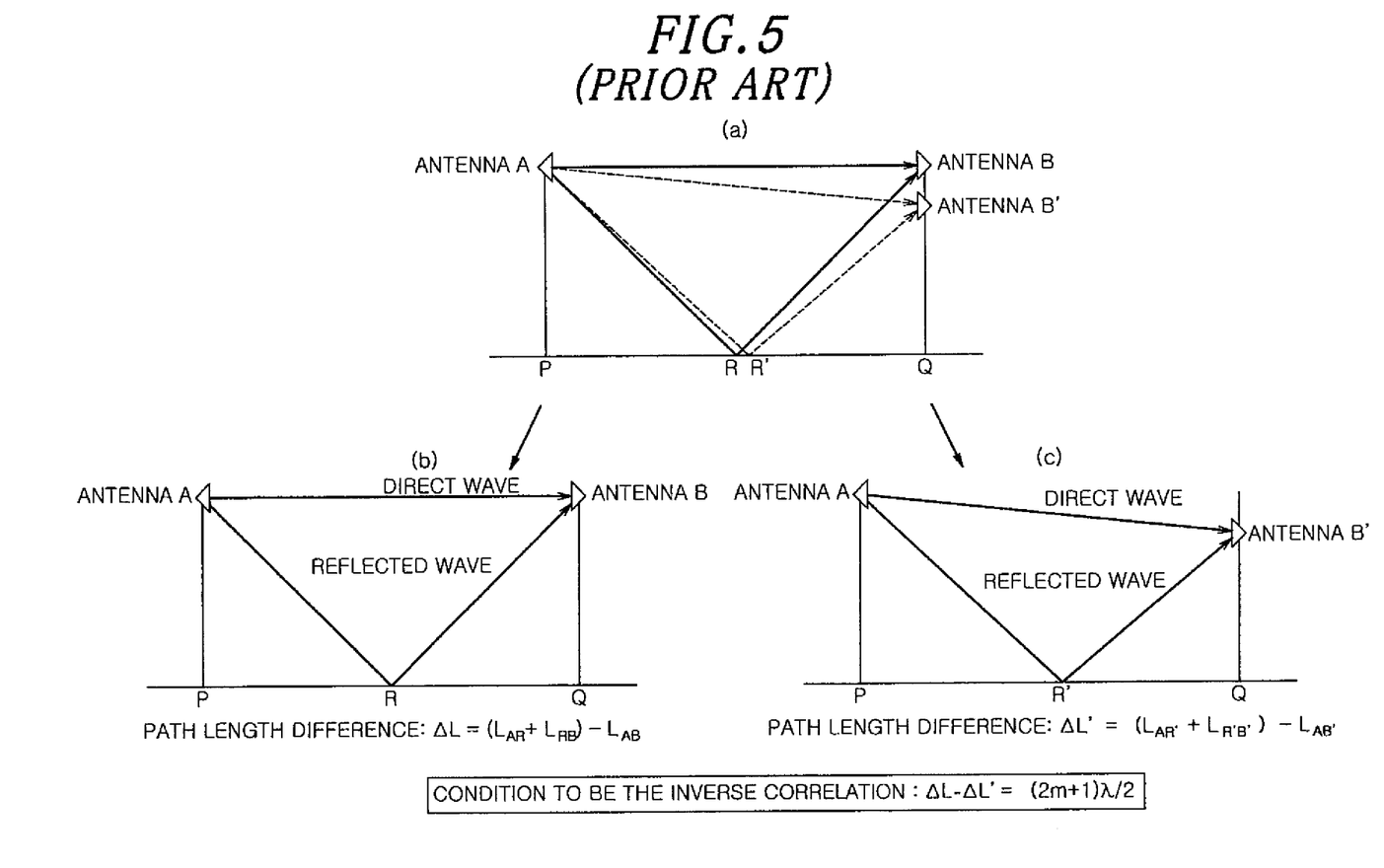

(a) of FIG. 5 shows the case in which communication is performed between point P and point Q. There are illustrated an antenna A in the point P, antennas B and B' in the point Q, a reflection point R of a reflected wave which connects the antenna A and the antenna B, and a reflection point R' of a reflected wave which connects the antenna A and the antenna B'.

(b) of FIG. 5 shows a path length $L_{AB}$ of a direct wave from the antenna A to the antenna B, and a difference $\Delta L$ ($=(L_{AR}+L_{RB})-L_{AB}$) with respect to a path length ($L_{AR}+L_{RB}$) of a reflected wave from the antenna A to the antenna B via the R point.

(c) of FIG. 5 shows a difference $\Delta L'$ ($=(L_{AR'}+L_{R'B'})-L_{AB'}$) between a path length $L_{AB'}$ of a direct wave from the antenna A to the antenna B' and a path length ($L_{AR'}+L_{R'B'}$) of a reflected wave from the antenna A to the antenna B via the R' point.

When communication is performed between the point P and the point Q in the example shown in (a) to (c) of FIG. 5, the difference in the path lengths between the direct wave and the reflected wave in the antennas B and B' needs to be (2 m+1)$\lambda$/2 in order to satisfy the inverse correlation between the antennas B and B' installed at the point Q. In other words, the condition for satisfying the inverse correlation is ($\Delta L - \Delta L' = (2m+1)\lambda/2$).

$\lambda$ is a wavelength of a signal, and m is an integer greater than or equal to 0.

Figure 6:
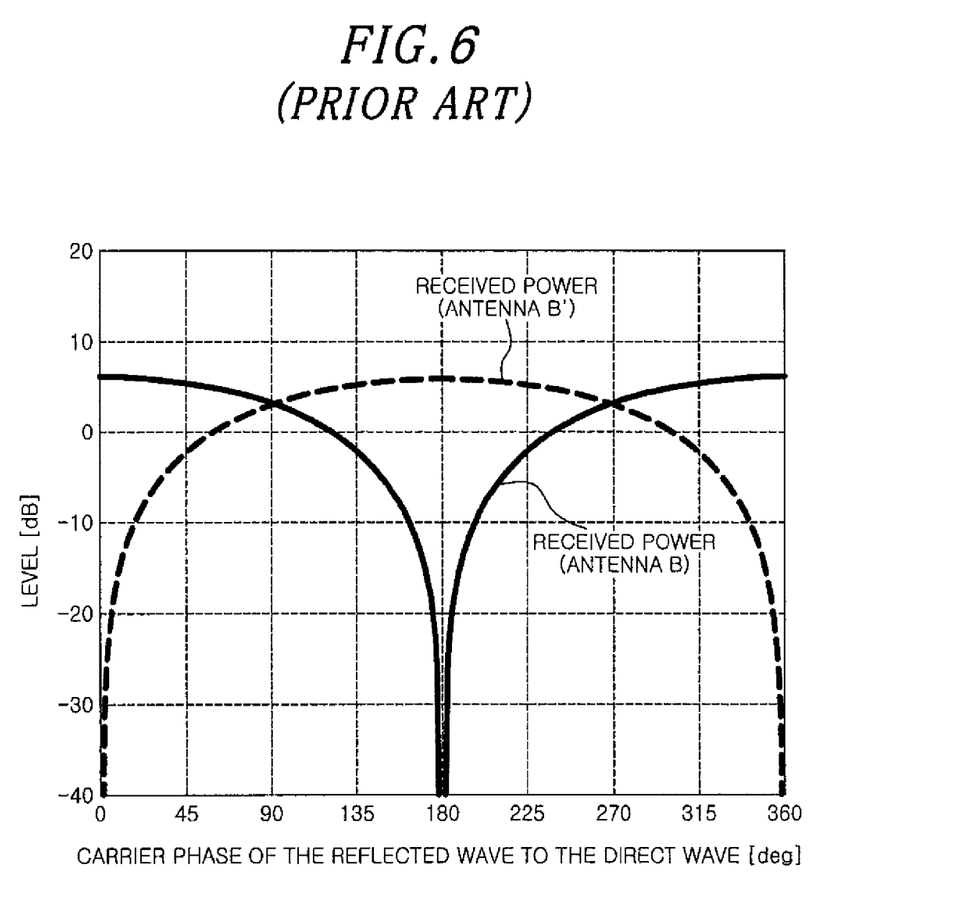
FIG. 6 shows an example of reception levels of antennas in an inverse correlation.

FIG. 6 shows an example of reception levels of the antennas B and B' in the inverse correlation. The reception levels of the antennas in the inverse correlation change as illustrated in FIG. 6.

In the graph shown in FIG. 6, the horizontal axis indicates a carrier phase [deg] of a reflected wave in the antenna B on the assumption that a carrier phase of a direct wave in the antenna B is 0, and the vertical axis indicates a level [dB]. FIG. 6 shows the received power (reception level) of the antenna B and the received power (reception level) of the antenna B'.

When the antennas are installed in an inverse correlation, if the reception level of one antenna is increased by changes in the sea surface, the reception level of the other antenna is decreased. At this time, the reception levels of both antennas become the same at certain timing. In the antenna selection diversity using the inverse correlation antenna, the system is selected at the timing at which the reception levels become equal to each other. As a result, a lower limit of the reception level can be guaranteed.

When the delay time of the sea surface reflected wave with respect to the direct wave is increased compared to the symbol interval, the frequency selectivity occurs by changes of levels within the band. In this case, the reception signal needs to be equalized. Since the propagation path characteristics change with time, an adaptive equalizer capable of adaptively updating the equalization coefficients is often used.

Here, an inner configuration example of a general adaptive equalizer will be described.

Figure 7:
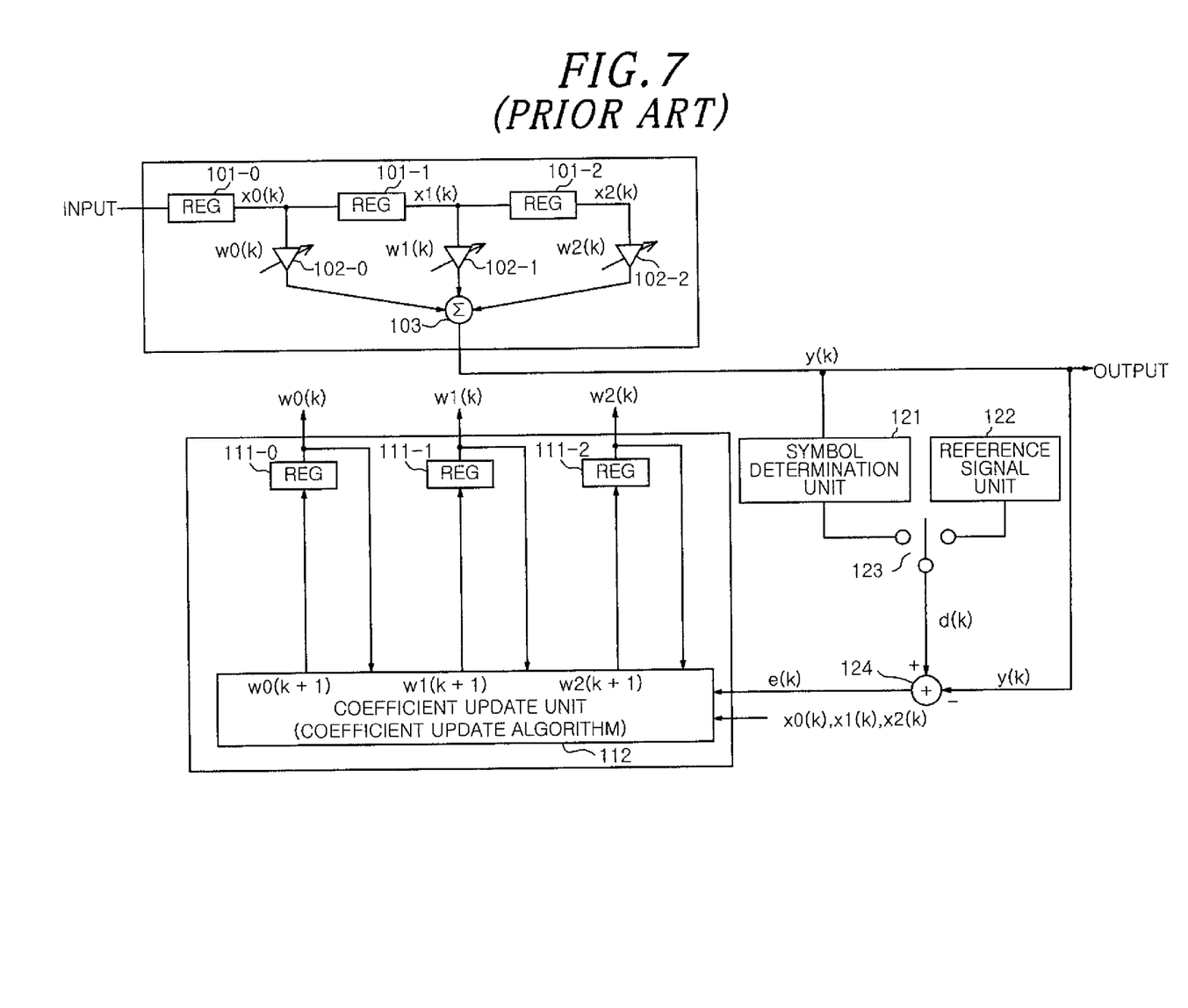
FIG. 7 shows an inner configuration example of a general adaptive equalizer.

FIG. 7 shows an inner configuration example of a general adaptive equalizer.

In this example, the tap number of the adaptive equalizer is equal to 3.

The adaptive equalizer of this example includes three registers (Reg) 101-0 to 101-2, three (coefficient variable) multipliers 102-0 to 102-2, and an adder (or accumulator) 103. Further, the adaptive equalizer includes three registers (Reg) 111-0 to 111-2, a coefficient update unit 112, a symbol determination unit 121, a reference signal unit 122, a switch 123, and an adder 124.

The configuration and operation of the adaptive equalizer shown in FIG. 7 is different from that of an embodiment to be described later, e.g., an adaptive equalizer shown in FIG. 2, in that the adaptive equalizer shown in FIG. 7 does not have selection units 22-0 to 22-2 and adjusting units 23-0 to 23-2 shown in FIG. 2 and control signals thereof. This is intended to make the understanding of the adaptive equalizer shown in FIG. 7 clear without unnecessarily limiting the configuration and operation of the adaptive equalizer shown in FIG. 2.

As an example of a prior art, Patent Document 1 describes a configuration example in which when two antennas having a correlation coefficient of −1 receive signals, an inverse correlation in which a reception input (e.g., electric field intensity) of one antenna becomes minimum when a reception input (e.g., an electric field intensity) of the other antenna becomes maximum is obtained (see Patent Document 1).

Further, Patent Document 2 describes an equalizer including a pilot symbol pattern generating circuit for generating a reference signal identical to a symbol pattern (see Patent Document 2).

Patent Document 1: Japanese Patent Application Publication No. 2002-135182

Patent Document 2: Japanese Patent Application Publication No. 2002-344362

For example, the extreme decrease of the reception level caused by changes of the reflection point can be prevented by performing control based on the level changes of the systems by using the inverse correlation antenna.

However, the propagation paths to the antennas have different characteristics. Accordingly, the convergence of the equalization coefficients needs to be performed again. Depending on the required time for the convergence process, the data may be demodulated in a state where the output quality of the equalizer is insufficient. In this case, a bit error ratio is high. When the bit error exceeds the limit of the error correction capability, the quality of the communication service deteriorates.

SUMMARY OF THE INVENTION

In view of the above, the present invention provides a reception device capable of reducing the required time for reconvergence of equalization coefficients stemming from reception system switching in selection diversity using an inverse correlation antenna.

In order to realize the above purposes, the reception device of the present invention has the following configuration.

Two antennas that are in an inverse correlation; a switching unit configured to switch the signal that is to be processed among signals received by the two antennas; an adaptive equalizer using equalization coefficients to perform equalizing processing on the signal considered by the switching unit to be the signal to be processed; and an equalization coefficient altering unit configured to alter the equalization coefficients used by the adaptive equalizer synchronously with the timing of switching performed by the switching unit.

Accordingly, it is possible to reduce the required time for reconvergence of equalization coefficients stemming from reception system switching in selection diversity using an inverse correlation antenna.

Here, two antennas are arranged in an inverse correlation. The present invention may be applied to a device having additional one or more antennas other than the two antennas in an inverse correlation (i.e., a device having an additional antenna other than the two antennas of the present invention).

The adaptive equalizer may have various configurations.

The signal that is to be processed among the signals received by the two antennas may be switched in various manners. For example, it may be switched to a signal whose level is about to be larger than that of a signal as a current processing target when the levels of both signals are identical to each other, or may be switched to a signal other than the signal whose level is larger than that of the signal as a current processing target when it is determined.

The equalization coefficients used by the adaptive equalizer synchronously with the timing of switching performed by the switching unit may be altered by setting the equalization coefficients used by the adaptive equalizer to an initial value after the switching prior to (e.g., immediately before) the switching performed by the switching unit.

When a time difference exists between the timing of switching a signal that is to be processed by the switching unit and the timing of initiating the processing of the signal that is to be processed by the switching by the adaptive equalizer, the equalization coefficients used by the adaptive equalizer may be set to an initial value after the switching prior to (e.g., immediately before) the timing of initiating the processing of the signal that is to be processed by the switching by the adaptive equalizer. This is also included in the present invention. The processing time difference in implementing the actual device may be considered in other parts of the present specification (particularly, other parts in "Summary of the Invention" or "Detailed Description of the Embodiments"). This is also included in the present invention.

The reception device of the present invention has the following configuration.

The equalization coefficient altering unit determines altered equalization coefficients based on equalization coefficients at the timing of switching performed by the switching unit.

Accordingly, the required time for reconvergence of the equalization coefficients can be reduced by determining the initial values of the equalization coefficients after the antenna switching based on, e.g., the equalization coefficients during (e.g., immediately before) the antenna switching.

Here, the determination of the altered equalization coefficients based on the equalization coefficients at the timing of switching performed by the switching unit may include the determination of the altered equalization coefficients based on the equalization coefficients before (e.g., immediately before) the switching is performed by the switching unit.

The reception device of the present invention has the following configuration.

The equalization coefficient altering unit determines, as the altered equalization coefficients, complex conjugates of the equalization coefficients at the timing of switching performed by the switching unit.

Therefore, the required time for reconvergence of the equalization coefficients can be reduced by setting the complex conjugates of the equalization coefficients during (e.g., immediately before) the antenna switching to initial values of the equalization coefficients after the antenna switching.

The reception device of the present invention has the following configuration.

The equalization coefficient altering unit determines, as the altered equalization coefficients, equalization coefficients obtained by setting imaginary numbers of the equalization coefficients at the timing of switching performed by the switching unit to 0 without changing real numbers of the equalization coefficients.

Accordingly, the required time for reconvergence of the equalization coefficients can be reduced by setting real numbers of the equalization coefficients during (e.g., immediately before) the antenna switching to initial values of the equalization coefficients after the antenna switching.

The reception device of the present invention has the following configuration.

The equalization coefficient altering unit uses preset values as altered equalization coefficients.

Hence, the required time for reconvergence of the equalization coefficients can be reduced by setting preset values to initial values of the equalization coefficients after the antenna switching.

Here, various values may be used as the present values.

The present invention can be embodied in, e.g., a method or the like.

For example, in the reception device for switching the signal that is to be processed among the signals received by the two antennas in an inverse correlation and performing equalizing processing on the signal considered to be the signal to be processed by using the equalization coefficients by the adaptive equalizer, the equalization coefficients used by the adaptive equalizer are altered synchronously with the timing of switching.

Effects of the Invention

As described above, in accordance with the present invention, it is possible to reduce required time for reconvergence of equalization coefficients stemming from reception system switching in selection diversity using an inverse correlation antenna.

BRIEF DESCRIPTION OF THE DRAWINGS

(a) to (h) of FIG. 4 show examples of a modulation wave spectrum on a carrier phase basis of a reflected wave.

(a) to (c) of FIG. 5 explain antenna selection diversity in which antennas are installed in an inverse correlation.

DETAILED DESCRIPTION OF THE EMBODIMENTS

Hereinafter, embodiments of the present invention will be described with reference to the accompanying drawings.

First Embodiment

A first embodiment of the present invention will be described.

Figure 1:
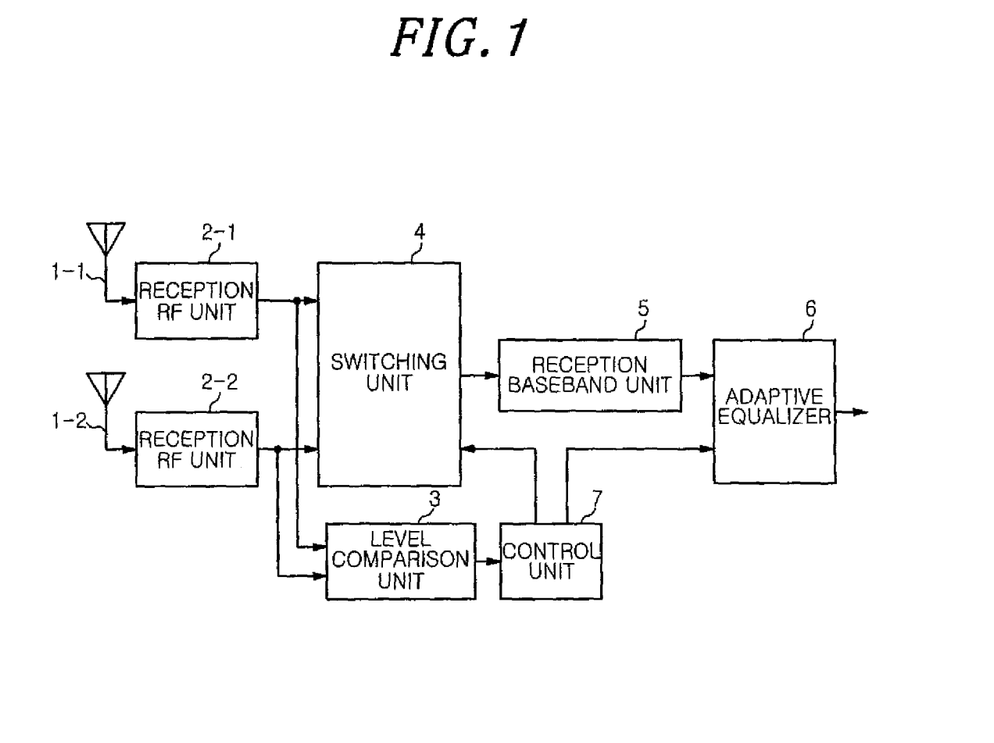
FIG. 1 shows a configuration example of a wireless reception device in accordance with an embodiment of the present invention.

FIG. 1 shows a configuration example of a wireless reception device in accordance with an embodiment of the present invention.

The wireless reception device of this example includes two reception systems, i.e., a first reception system having an antenna 1-1 and a reception RF (radio frequency) unit 2-1 and a second reception system having an antenna 1-2 and a reception RF unit 2-2. In addition, the wireless reception device includes, as common processing units thereof, a level comparison unit 3, a switching unit 4, a reception baseband unit 5, an adaptive equalizer 6, and a control unit 7.

In this example, two antennas 1-1 and 1-2 are installed in an inverse correlation.

Here, in the wireless reception device of this example, the two antennas 1-1 and 1-2 receive and process signals wirelessly transmitted from a wireless transmission device (not shown). The signals include a reflected wave, as well as a direct wave.

Further, a wireless communication device having both functions of a wireless transmission device and a wireless reception device may be used in a transmission side and a reception side. The communication may be two-way communication performed between two wireless communication devices as well as one-way communication performed from the transmission side to the reception side.

Hereinafter, an example of an operation performed by the wireless reception device of this example will be described.

In the first reception system, a signal wirelessly received from the first antenna 1-1 is subjected to reception RF processing by the first reception RF unit 2-1, and the processed signal is input to the level comparison unit 3 and the switching unit 4.

In the second reception system, a signal wirelessly received from the second antenna 1-2 is subjected to reception RF processing by the second reception RF unit 2-2, and the processed signal is input to the level comparison unit 3 and the switching unit 4.

The level comparison unit 3 detects (measures) a level (e.g., a power value) of the signal input by the first RF unit 2-1 and a level (e.g., a power value) of the signal input by the second RF unit 2-2 and compares the levels thereof. The information on the comparison result is output to the control unit 7.

The control unit 7 controls the switching process of the switching unit 4 based on the information input by the level comparison unit 3 and also controls the adaptive equalizer 6.

In this example, the control unit 7 controls the equalization coefficients of the adaptive equalizer 6 to be initialized synchronously with the timing of switching the reception system to be processed by the switching unit 4 (e.g., before the switching of the reception system). When the reception system cannot be switched, the equalization coefficients of the adaptive equalizer 6 are updated based on a predetermined coefficient update algorithm.

The switching unit 4 is controlled by the control unit 7 and performs switching between the state in which one of the signals received from the first and the second reception RF unit 2-1 and 2-2 (e.g., the signal from the first reception RF unit 2-1) is output to the reception baseband unit 5 and the state in which the other one of the signals (e.g., the signal from the second reception RF unit 2-2) is output to the reception baseband unit 5.

The reception baseband unit 5 performs reception baseband processing on the signal input by the switching unit 4 and outputs the processed signal to the adaptive equalizer 6.

The adaptive equalizer 6 is controlled by the control unit 7 to perform equalization processing on the signal input by the reception baseband unit 5 and output the processed signal.

In this example, the two reception systems have the same characteristics from the antennas 1-1 and 1-2 to the point for selecting the system by measuring the received power. The inverse correlation is realized by moving the installation locations of the antennas 1-1 and 1-2.

In the wireless reception device of this example, the antennas 1-1 and 1-2 are switched at rear sides of the reception RF units 2-1 and 2-2. However, the switching location is only an example and not essential for this embodiment.

In this example, after the reception system is selected (switched), the signal received by the selected system is input to the common baseband processing unit (reception baseband unit 5).

The baseband processing, e.g., the processing until the output of the signal from the reception filter, is a general reception process. At this time, various configurations may be used since it is not essential for this example.

In this example, the signal that has been subjected to the baseband processing (e.g., the signal output from the reception filter) is equalized by the adaptive equalizer 6.

In this example, the reception level of the systems are detected (monitored) and compared. As a result of the comparison, a reception system whose reception level is (relatively) increased or is likely to be increased is determined and the switching is performed to select such reception system.

The reception system may be selected by various methods. For example, a method for determining (selecting) a reception system based on a spectrum measurement result of a reception signal may be used other than the method for selecting a reception system based on a reception level.

Figure 2:
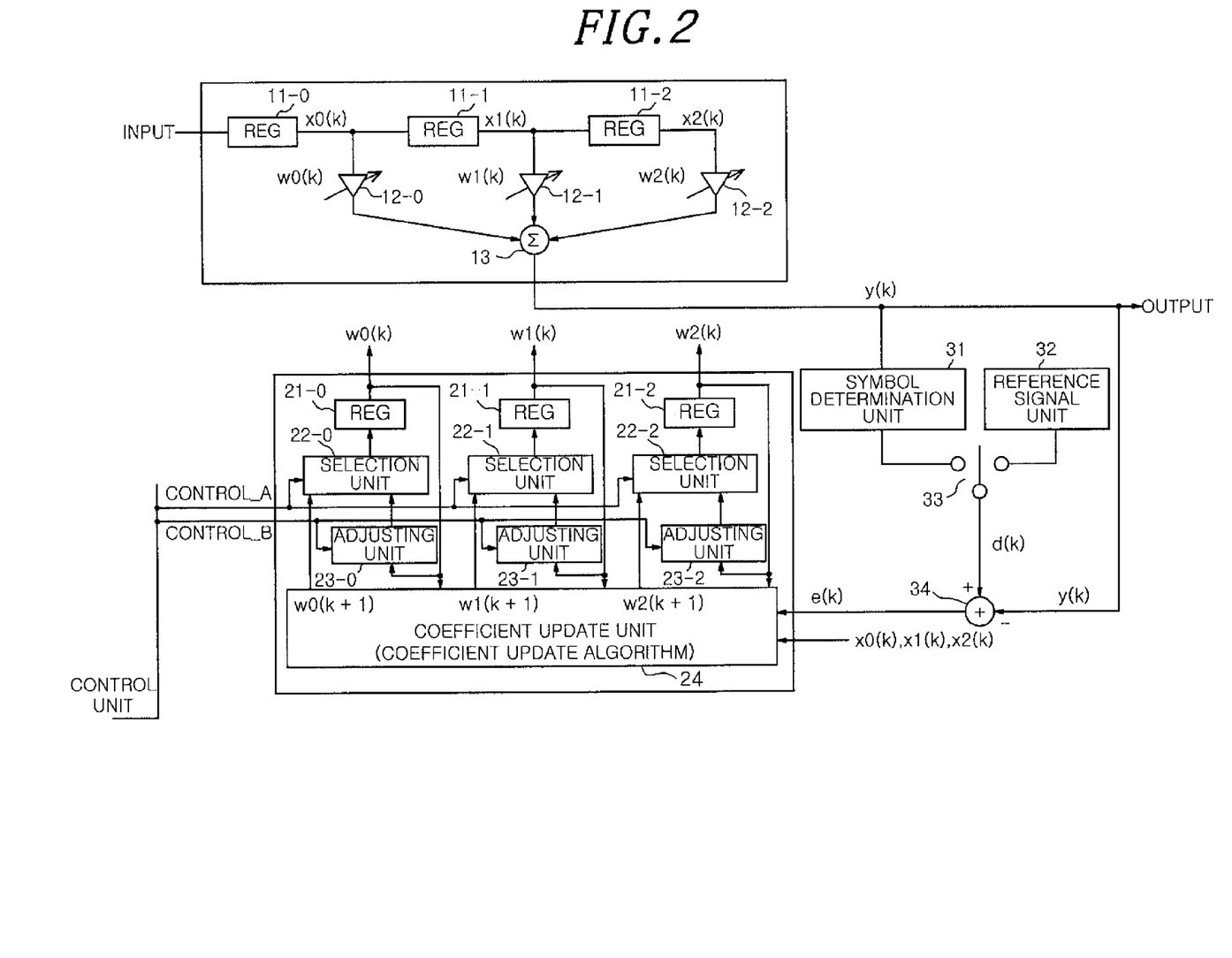
FIG. 2 shows an inner configuration example of an adaptive equalizer.

FIG. 2 shows an inner configuration example of the adaptive equalizer 6.

Although the tap number of the adaptive equalizer 6 equals to 3 in this example, various tap numbers may also be used.

The adaptive equalizer 6 of this example includes three registers (Reg) 11-0 to 11-2, three (coefficient variable) multipliers 12-0 to 12-2, an adder (or accumulator) 13, three registers (Reg) 21-0 to 21-2, three selection units 22-0 to 22-2, three adjusting units 23-0 to 23-2, a coefficient update unit 24, a symbol determination unit 31, a reference signal unit 32, a switch 33, and an adder 34.

In this example, it is assumed that n equals 0, 1 or 2; k indicates time (e.g., sample number); xn(k) indicates an input signal; y(k) indicates an output signal; d(k) indicates a desired signal; e(k) indicates an equalization error signal; and wn(k) indicates an equalization coefficient.

In this example, xn(k), y(k), d(k), e(k), and wn(k) are complex numbers.

Hereinafter, the example of the operation performed by the adaptive equalizer 6 of this example will be described.

The input signal passes through the three registers 11-0 to 11-2 connected in series.

An output signal $x0(k)$ from the first register 11-0 is input to the first accumulator 12-C to multiply the equalization coefficient $w0(k)$. The result signal is input to the adder 13.

An output signal $x1(k)$ from the second register 11-1 is input to the second accumulator 12-1 to multiply the equalization coefficient $w1(k)$. The result signal is input to the adder 13.

An output signal $x2(k)$ from the third register is input to the third multiplier 12-2 to multiply an equalization coefficient $w2(k)$. The result signal is input to the adder 13.

The adder 13 adds (combines) the signals input by the three multipliers 12-0 to 12-2, and outputs the signal of the addition result as the output signal y(k). The signal y(k) is input to the symbol determination unit 31 and the adder 34.

The symbol determination unit 31 determines a symbol for the signal y(k) input from the adder 13 and outputs the signal of the determined symbol.

The reference signal unit 32 outputs a reference signal such as a predetermined symbol for training which has been stored in a memory or the like.

The switch 33 is controlled by, e.g., the control unit 7 to perform switching between the state in which the symbol signal from the symbol determination unit 31 is selected as a desired signal d(k) and output to the adder 34 and the state in which the reference signal from the reference signal unit 32 is selected as a desired signal d(k) and output to the adder 34.

The adder 34 subtracts the output signal y(k) from the adder 13 from the desired signal d(k) from the switch 33, and then outputs the signal (equalization error signal) e(k) (=d(k)−y(k)) of the subtraction result to the coefficient update unit 24.

The coefficient update unit 24 inputs the input signals $x0(k)$, $x1(k)$ and $x2(k)$, the equalization error signal e(k) and the equalization coefficients $w0(k)$, $w1(k)$ and $w2(k)$ output from the registers 21-0 to 21-2, and calculates and outputs updated equalization coefficients $w0(k+1)$, $w1(k+1)$, $w2(k+1)$ in accordance with a predetermined coefficient update algorithm to the respective selecting units 22-0 to 22-2. Specifically, the equalization coefficient $w0(k+1)$ is output to the first selection unit 22-0; the equalization coefficient $w1(k+1)$ is output to the second selecting unit 22-1; and the equalization coefficient $w2(k+1)$ is output to the third selection unit 22-2.

In this example, the input information time k has been described by using the output information time (k+1). However, the time (k+1) is considered as the time k in the next processing.

The adjusting units 23-0 to 23-2 receive the equalization coefficients $w0(k)$, $w1(k)$ and $w2(k)$ output from the registers 21-0 to 21-2, perform adjustment thereon, and output the adjusted equalization coefficients to the selection units 22-0 to 22-2, respectively. Specifically, the first adjusting unit 23-0 receives the equalization coefficient $w0(k)$, performs adjustment and outputs the adjustment result; the second adjusting unit 23-1 inputs the equalization coefficient $w1(k)$, performs adjustment and outputs the adjustment result; the third adjusting unit 23-2 inputs the equalization coefficient $w2(k)$, performs adjustment and outputs the adjustment result.

The adjusting units 23-0 to 23-2 are controlled by, e.g., a predetermined control signal (control A) input by the control unit 7.

The selection units 22-0 to 22-2 receive the updated equalization coefficients $w0(k+1)$, $w1(k+1)$, $w2(k+1)$ from the coefficient update unit 24 (here, the time (k+1) is considered as the time k, and the equalization coefficients $w0(k+1)$, $w1(k+1)$ and $w2(k+1)$ are considered as $w0(k)$, $w1(k)$ and $w2(k)$) and the adjusted equalization coefficients from the adjusting units 23-0 to 23-2, select coefficients, and output the selected coefficients to the register 21-0 to 21-2. Specifically, the first selection unit 22-0 performs input and output for the equalization coefficient $w0(k)$; the second selection unit 22-1 performs input and output for the equalization coefficient $w1(k)$; and the third selection unit 22-2 inputs and outputs for the equalization coefficient $w2(k)$.

The selection units 22-0 to 22-2 are controlled by, e.g., a predetermined control signal (control B) input by the control unit 7.

In this example, when the reception system is switched by the switching unit 4, the selecting units 22-0 to 22-2 select the adjusting equalization coefficients from the adjusting units 23-0 to 23-2 and output the selected equalization coefficients to the registers 21-0 to 21-2, respectively. When the reception system is not switched, the selection units 22-0 to 22-2 are controlled such that the updated equalization coefficients from the coefficient update unit 24 are selected and output to the registers 21-0 to 21-2. Accordingly, when the reception system is switched by the switching unit 4, the equalization coefficients wn(k) are initialized.

The registers 21-0 to 21-2 output the equalization coefficients $w0(k)$, $w1(k)$ and $w2(k)$ input from the selection units 22-0 to 22-2 to the multipliers 12-0 to 12-2, the adjusting units 23-0 to 23-2 and the coefficient update unit 24. Specifically, the first to the third register 21-0 to 21-2 process the equalization coefficients $w0(k)$, $w1(k)$ and $w2(k)$, respectively.

Figure 3:
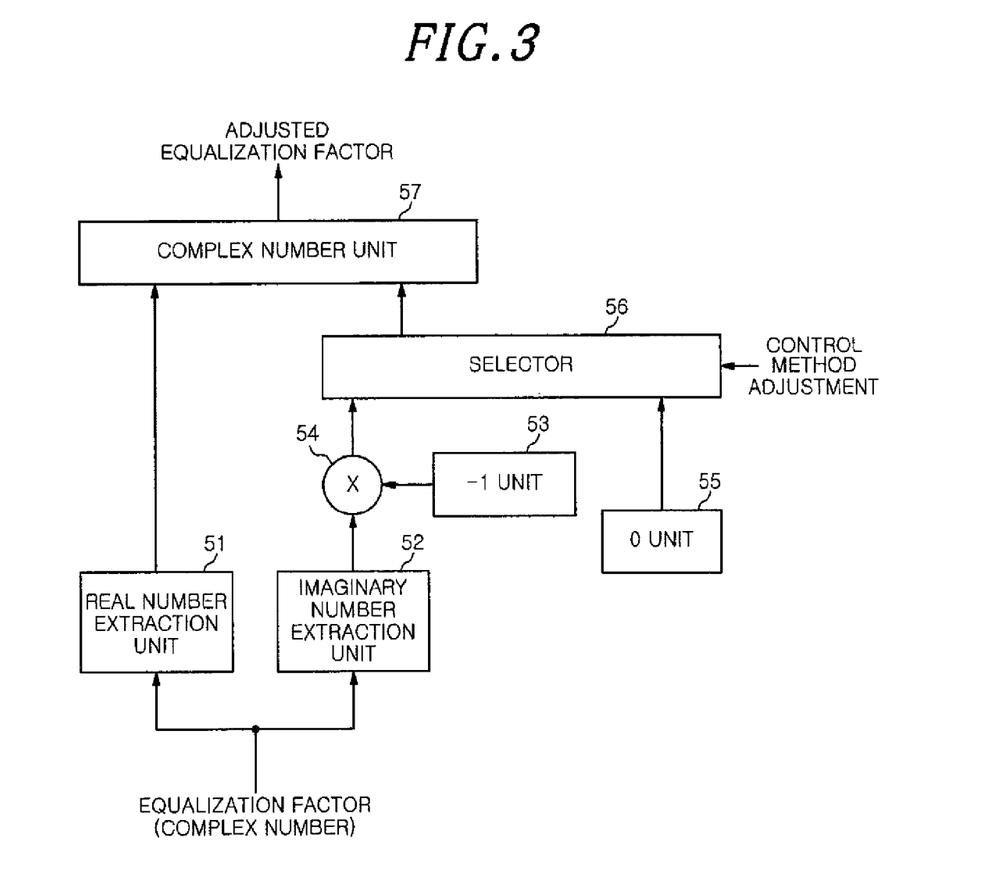
FIG. 3 shows an inner configuration example of an adjusting unit.

FIG. 3 shows an inner configuration example of the adjusting unit 23-0. The other adjusting units 23-1 and 23-2 have the same inner configuration as that of the adjusting unit 23-0.

The adjusting unit 23-0 of the present example includes a real number extraction unit 51, an imaginary number extraction unit 52, a −1 unit 53, a multiplier 54, a 0 unit 55, a selector 56, and a complex number unit 57.

Hereinafter, an example of the operation performed by the adjusting unit 23-0 of this example will be described. This is applied to the other adjusting units 23-1 and 23-2.

The equalization coefficients wn(k) output from the register 21-0 ($w0(k)$ in the case of the adjusting unit 23-0) are input to the real number extraction unit 51 and the imaginary number extraction unit 52.

The real number extraction unit 51 extracts the real number of the input equalization coefficients wn(k) and outputs the extracted one to the complex number unit 57.

The imaginary number extraction unit 52 extracts the imaginary number of the input equalization coefficients wn(k) and outputs the extracted imaginary number to the multiplier 54.

The −1 unit 53 outputs the signal of −1 to the multiplier 54.

The multiplier 54 multiplies the imaginary number signal from the imaginary number extraction unit 52 and the −1 signal from the −1 unit 53, and outputs the signal of the multiplication result (−1×the imaginary number) to the selector 56.

The 0 unit 55 outputs the signal of 0 to the selector 56.

The selector 56 performs switching between a state in which a signal from the multiplier 54 is selected and output to the complex number unit 57 and a state in which a signal from the 0 unit 55 is selected and output to the complex number unit 57.

The selector 56 is controlled by, e.g., a predetermined control signal (control A) for controlling adjustment which is input by the control unit 7.

The complex number unit 57 generates a complex number formed of a real number and an imaginary number based on the signal of the real number input from the real number extraction unit 51 and the signal of the imaginary number input from the selector 56, and outputs the signal as the adjusted equalization coefficients wn(k) (w0(k) in the case of the adjusting unit 23-0) to the selection unit (the selection unit 22-0 in the case of the adjusting unit 23-0).

When the signal (−1×imaginary number) from the multiplier 54 is selected by the selector 56, the complex number unit 57 outputs, as the adjusted equalization coefficients wn(k), equalization coefficients in which plus or minus of the imaginary number of the equalization coefficients wn(k) input to the adjustment unit 23-0 are reversed.

When the signal (0) from the 0 unit 55 is selected by the selector 56, the complex number unit 57 outputs, as the adjusted equalization coefficients wn(k), equalization coefficients in which the imaginary number of the equalization coefficients wn(k) input to the adjustment unit 23-0 is 0 (only having the real number).

In this example, the case in which the signal (−1×imaginary number) from the multiplier 56 is selected by the selector 56 will be described.

When the reception system is actually switched, the complex conjugate of each of the equalization coefficients is obtained by reversing plus or minus of each of the imaginary numbers of one or more converged equalization coefficients wn(k), and the equalization coefficients wn(k) are initialized by using the value (the adjusted equalization coefficients). Otherwise, the equalization coefficients wn(k) are updated based on a predetermined equalization coefficients algorithm.

Figure 4:
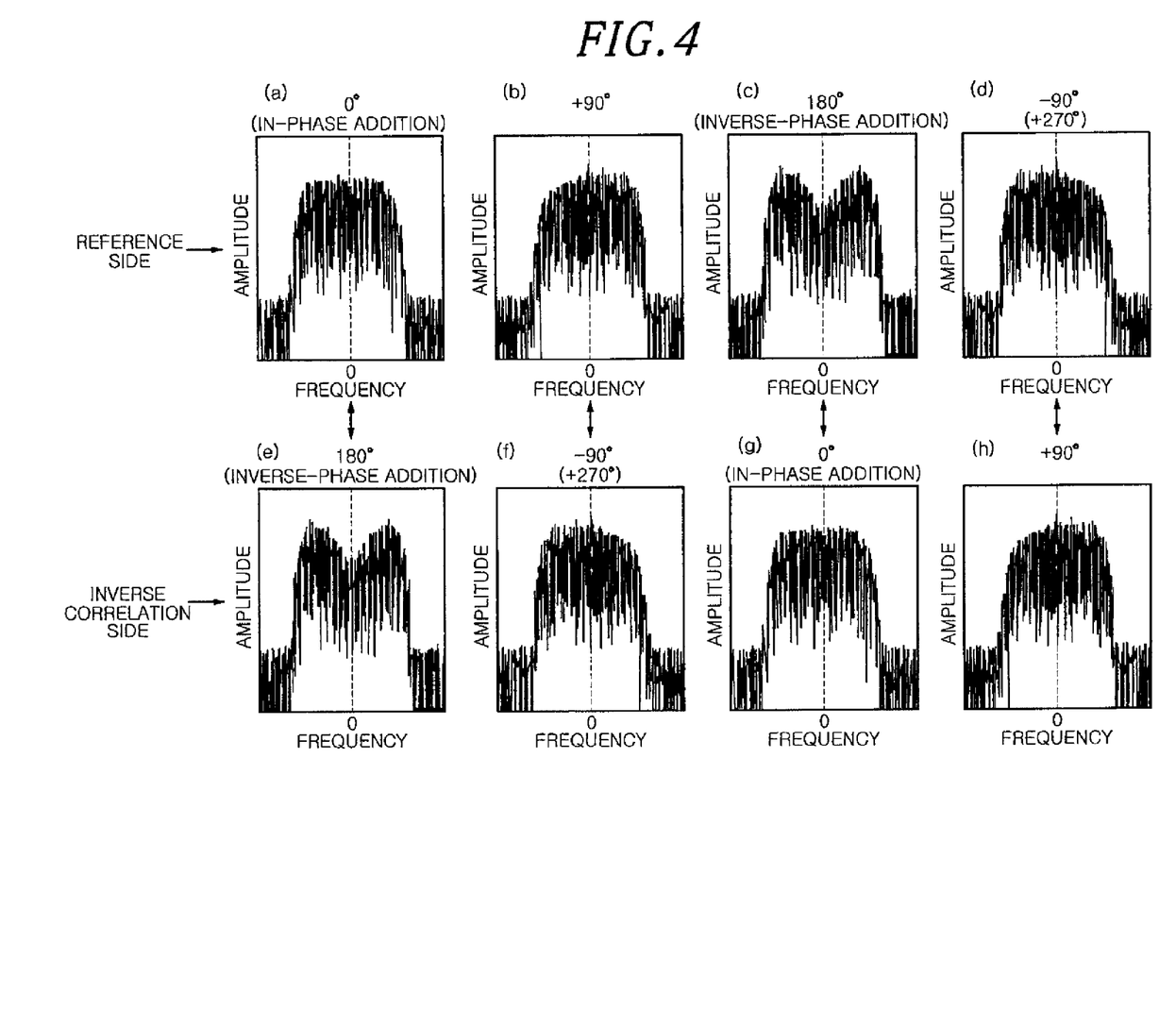

Here, the reason that the complex conjugate is obtained as the initial values of the equalization coefficients wn(k) at the timing of switching the reception system is because the spectrum of the reception signal, with respect to the relative phase of the carrier of the reflected wave (delay wave) in the case of setting the phase of the carrier of the direct wave to 0, satisfies the relationship shown in (a) to (h) of FIG. 4.

(a) to (h) of FIG. 4 show examples of a modulated spectrum of a reflected wave on a carrier phase basis.

(a) to (d) of FIG. 4 show the reception system of the reference side at 0° (in-phase addition), +90°, 180° (inverse-phase addition), and )-90° (+270°. (e) to (h) of FIG. 4 show the reception system of the inverse correlation side at 180° (inverse-phase addition), −90° (+270°), 0° (in-phase addition), and +90°. (a) to (d) of FIG. 4 correspond to (e) to (h) of FIG. 4, respectively.

In the graphs of (a) to (h) of FIG. 4, the horizontal axis indicates a frequency and the vertical axis indicates an amplitude.

The switching is executed when +90° is shifted to −90° or when −90° is shifted to +90°, for example. As shown in (a) to (h) of FIG. 4, the spectra at that time are balanced on both sides, i.e., both sides are reversed with respect to DC characteristics. This means that the equalization coefficients for compensating the propagation path characteristics of one antenna can compensate the propagation path characteristics of the other antenna by using the complex conjugate thereof.

Due to the initialization of the equalization coefficients as in this example, when the antenna is switched, the additional convergence time for other propagation path characteristics becomes unnecessary. As a consequence, the communication quality can be maintained during the switching.

Hereinafter, the effective conditions for initializing the equalization coefficients in the selection diversity of the inverse correlation in this example will be described.

First, both sides of the reception signal spectrum of each reception system need to be symmetric during the switching.

If it is satisfied, the effect is noticeable as the delay of the reflected wave with respect to the direct wave is increased. However, if the delay is excessive, the communication quality during the period unrelated to the diversity is affected. Therefore, the effect of this example is clearly seen as the delay is increased within the range in which such effect can be ignored.

The length of the delay time is determined by the relationship between the device installation length and the antenna installation height.

For example, even if the devices are separated, when the antenna installation height is low, the difference between the path length of the direct wave and the path length of the reflected wave is not increased.

On the contrary, even if the devices are not separated, when the antenna installation height is high, the difference between the path length of the direct wave and the path length of the reflected wave is increased.

For example, under the environment in which opposite antennas are fixed and the propagation path is across the sea, the relationship between the direct wave and the reflected wave is comparatively simple. Therefore, the relationship of the phase difference between the direct wave and the reflected wave of the diver antenna is substantially maintained at $\lambda/2$. Accordingly, the effect of this example is increased.

In this example, the antenna is switched, so that TDD (time division duplexing) is more suitable than FDD (frequency division duplexing).

In the wireless reception device of this example, a reference antenna (e.g., an antenna 1-1) and an inverse correlation antenna (e.g., an antenna 1-2) installed in an inverse correlation with respect to the reference antenna are used. The reception levels of the reference antenna and the inverse correlation antenna are detected (monitored), and the reception system to be used is determined based on the level comparison result. The reception signal is equalized by the adaptive equalizer 6, and the equalization coefficients are initialized at the timing of switching the reception system based on the equalization coefficients before the switching of the reception system. Accordingly, it is possible to reduce the required time for reconvergence of the equalization coefficients due to antenna switching in antenna selection diversity.

In the wireless reception device of this example, in order to obtain the initial values of the equalization coefficients, the complex conjugates of the equalization coefficients immediately before the switching are calculated as the initial values of the equalization coefficients during the switching. In this example, when the equalization coefficients are initialized at the timing of switching the antenna, the complex conjugates of the coefficients are calculated based on the convergence values of the equalization coefficients immediately before the antenna switching. The calculated value is used as the initial value.

Accordingly, in the wireless reception device of this example, the required time for reconvergence of the equalization coefficients immediately after the switching from the current antenna to the antenna in an inverse correlation can be reduced by using the method for initializing the equalization coefficients of the reception signal by the antenna selection diversity using an inverse correlation antenna in the diversity technique of the wireless system. In the present example, the complex conjugates of the equalization coefficients immediately before the antenna switching are obtained for the reconvergence of the equalization coefficients immediately after the antenna switching. The obtained value is set to an initial value of equalization coefficients at the timing of initiating the reconvergence of the equalization coefficients.

In this example, in the antenna selection diversity technique that selectively uses two reception antennas in an inverse correlation in accordance with the reception state, the convergence time of the equalization coefficients during the antenna switching can be effectively reduced especially under the environment in which the reception antenna and the transmission antenna are installed across the sea.

The wireless reception device (an example of the reception device) of this example includes: the switching unit 4 for switching a signal that is to be processed among signals received by two antennas 1-1 and 1-2 in an inverse correlation; the adaptive equalizer 6 for performing equalization processing on the signal that is to be processed by the switching unit 4 by using the equalization coefficients; and the control unit 7 serving as an equalization coefficient altering unit for altering the equalization coefficients used by the adaptive equalizer 6 synchronously with the timing of switching performed by the switching unit 4 based on the result of comparison by the level comparison unit 3 under the control of the control unit 7.

Second Embodiment

A second embodiment of the present invention will be described.

In the first embodiment, the complex conjugates of the convergence values of the equalization coefficients are obtained as the initial values of the equalization coefficients during the switching of the reception system. Meanwhile, in the second embodiment, only the real numbers of the convergence values of the equalization coefficients are used in calculating the initial values of the equalization coefficients during the switching of the reception system. In the present embodiment, the case of only using the real number is the same as the case of setting of the imaginary number to 0.

Hereinafter, the case in which a signal (0) from the 0 unit 55 is selected by the selector 56 of the adjusting unit shown in FIG. 3 will be described.

When a signal (0) from the 0 unit 55 is selected by the selector 56 as in this example, the complex number unit 57 outputs, as the adjusted equalization coefficients wn(k), equalization coefficients in which the imaginary of the equalization coefficients wn(k) input to the adjusting unit is set to 0 (only having the real number).

When ideal inverse correlation is satisfied in the reception level changes of the antennas, the complex conjugate of the coefficient for compensating the characteristics of one propagation path becomes the coefficient for compensating the characteristics of the other preparation path. The coefficient having the imaginary number of 0 may be considered as the average of the coefficients before and after the calculation of the complex conjugate. Accordingly, the different frequency characteristics, having corresponding values are obtained.

As described above, in the wireless reception device of this example, the initial values of the equalization coefficients in the switching are obtained by setting the imaginary numbers of the equalization coefficients immediately before the switching to 0 without changing the real number. In this example, when the equalization coefficients are initialized during the antenna switching, the imaginary number of the coefficient is set to 0 based on the convergence values of the equalization coefficients immediately before the antenna switching. The equalization coefficients thus obtained are used as the initialization values.

Hence, in the wireless reception device of this example, additional convergence time for other propagation characteristics can be shortened, and the communication quality can be maintained during the antenna switching. For example, even when the sea surface state varies and the inverse correlation is not ideal, the required time for the reconvergence of the equalization coefficients can be reduced.

Third Embodiment

A third embodiment of the present invention will be described.

In the first and the second embodiment, there has been described the configuration example of the wireless reception device in which the convergence time of the equalization coefficients for the signal received from the switched antenna is reduced by setting equalization coefficients different from the equalization coefficients adaptively converged by the reception signal from the antenna before the switching synchronously with the timing of switching the antennas (by changing the equalization coefficients).

Here, other equalization coefficients (the initial values of the equalization coefficients after the antenna switching) may be various coefficients without being limited to those described in the first and the second embodiment.

In this example, this will be described.

The first embodiment has described the example in which the complex conjugates of the equalization coefficients immediately before the antenna switching timing is used as the initial value. However, the complex conjugate is not necessarily used, and the convergence time of the equalization coefficients can be shortened, without using the complex conjugate, by applying a coefficient capable of reducing the convergence time after the antenna switching based on the equalization coefficients immediately before the antenna switching timing. For example, new equalization coefficients may be applied based on the analysis result of the reception spectrum and the equalization coefficients immediately before the antenna switching timing.

The second embodiment has described the example of using, as the initial values, equalization coefficients obtained by setting the imaginary numbers of the equalization coefficients immediately before the antenna switching timing to 0 without changing the real numbers.

In a modification of the second embodiment, each of the equalization coefficients immediately before the antenna switching timing has the imaginary number of 0 and the real number of 0 or 1 or another preset value, instead of the real number of the convergence value immediately before the antenna switching timing. Further, such equalization coefficients are used as the initial values. The required time for convergence can be reduced even in the case of using the initial value of this modification. When a value other than 0 or 1 is used as the real number, a proper initial value can be set in accordance with, e.g., antenna characteristics or the like.

As described above, various values may be used for initial values of an equalizing coefficient during the antenna switching.

In one configuration example, the wireless reception device has two reception antennas in an inverse correlation, and the two reception antennas are selectively switched. A single adaptive equalizer is provided for the two reception antennas, and the equalization coefficients of the adaptive equalizer are altered synchronously with the timing of switching the antenna.

In one configuration example, the equalization coefficients changed synchronously with the antenna switching timing are applied based on the equalization coefficients at the timing of (e.g., immediately before) the antenna switching.

In one configuration example, the complex conjugates of the equalization coefficients at the timing of (e.g., immediately before) the antenna switching are applied as the equalization coefficients changed synchronously with the antenna switching timing.

In one configuration example, the equalization coefficients having the imaginary number of 0 and the real numbers at the timing of (e.g., immediately before) the antenna switching are applied as the equalization coefficients changed synchronously with the antenna switching timing.

In one configuration example, predetermined values (initial values) are applied as the equalization coefficients changed synchronously with the antenna switching timing.

(Hereinafter, a configuration example in which three or more reception systems are switched will be described.)

In the above, the configuration example in which two reception systems are switched has been described. However, a configuration in which three or more reception systems are switched may be implemented.

In one configuration example, a reception device include three or more antennas in a specific correlation relationship, a switching unit for switching a signal that is to be processed among signals received by the three or more antennas, an adaptive equalizer for performing equalization processing on the signal that is to be processed by the switching unit by using equalization coefficients, and an equalization coefficient altering unit for altering the equalization coefficients used by the adaptive equalizer synchronously with the timing of switching performed by the switching unit.

In such configuration as well, for example, it is possible to reduce the required time for reconvergence of the equalization coefficients stemming from reception system switching in selection diversity using three or more antennas in a specific correlation relationship.

Here, in one configuration example, the equalization coefficient altering unit determines the altered equalization coefficients based on the equalization coefficients at the timing of the switching by the switching unit. In another configuration example, the equalization coefficient altering unit uses preset values as the altered equalization coefficients.

(Hereinafter, the configuration example in three or more reception systems are switched will be described.)

SUMMARY OF THE EMBODIMENTS

Here, the configuration of the system or the device related to the present invention is not limited to the above, and may be variously modified. The present invention may be embodied as a method for performing processing related to the present invention, a program for realizing the method, or a recording medium for recording the program. Moreover, the present invention can be embodied as various systems or devices.

The application field of the present invention is not limited to the above, and the present invention can be applied to various fields.

Various processes performed in the system or the device related to the present invention may be performed by a configuration in which a processor in a hardware resource having a processor, a memory or the like executes a control program stored in a ROM (read only memory), or by a hardware circuit having various independent functional units for executing the processes.

The present invention may be recognized as a computer readable recording medium storing the control program, such as a floppy (registered trademark) disk or a CD (compact disc)-ROM, or the corresponding program (itself). The processes related to the present invention may be executed by executing the control program input from the recording medium to the computer.

INDUSTRIAL APPLICABILITY

The present invention is suitable for a reception device that is applicable to selection diversity using an inverse correlation antenna.

DESCRIPTION OF REFERENCE NUMERALS

1-1, 1-2 antenna
2-1, 2-2 reception RE unit
3 level comparison unit
4 switching unit
5 reception baseband unit
6 adaptive equalizer
7 control unit
11-0 to 11-2, 21-0 to 21-2, 101-0 to 101-2, 111-0 to 111-2 register
12-0 to 12-2, 102-0 to 102-2 (coefficient variable) multiplier
13, 103 adder (or accumulator)
22-0 to 22-2 selection unit
23-0 to 23-2 adjusting unit
24, 112 coefficient update unit
31, 121 symbol determination unit
32, 122 reference signal unit
33, 123 switch
34, 124 adder
51 real number extraction unit
52 imaginary number extraction unit
53 −1 unit
54 multiplier
55 0 unit
56 selector
57 complex number unit

What is claimed is:

1. A reception device comprising:
   two antennas that are in an inverse correlation;
   a switching unit configured to switch the signal that is to be processed among signals received by the two antennas;
   an adaptive equalizer using equalization coefficients to perform equalizing processing on the signal considered by the switching unit to be the signal to be processed; and
   an equalization coefficient altering unit configured to alter the equalization coefficients used by the adaptive equalizer synchronously with the timing of switching performed by the switching unit, wherein the equalization coefficient altering unit determines altered equalization coefficients based on equalization coefficients at the timing of switching performed by the switching unit.

2. The reception device of claim 1, wherein the equalization coefficient altering unit determines, as the altered equalization coefficients, complex conjugates of the equalization coefficients at the timing of switching performed by the switching unit.

3. The reception device of claim 1, wherein the equalization coefficient altering unit determines, as the altered equalization coefficients, equalization coefficients obtained by setting imaginary numbers of the equalization coefficients at the timing of switching performed by the switching unit to 0 without changing real numbers of the equalization coefficients.

4. The reception device of claim 1, wherein the equalization coefficient altering unit uses preset values as altered equalization coefficients.

\* \* \* \* \*